United States Patent Office
3,121,613
Patented Feb. 18, 1964

3,121,613
CALCIUM DETERMINATION METHOD
Donald L. Bittner, 2200 Hayes St., San Francisco, Calif.
No Drawing. Filed Apr. 26, 1961, Ser. No. 105,551
7 Claims. (Cl. 23—230)

This invention relates to quantitative volumetric analysis for determining calcium in a solution. More particularly, it relates to the direct titration of calcium in the presence of magnesium employing chelometric and colorimetric indicator techniques.

In a preferred embodiment, it relates to the volumetric determination of calcium in blood serum in which magnesium is also normally present. The calcium is directly titrated with ethylene glycol bis ($\beta$-aminoethyl ether)-N,N'-tetraacetic acid and the end point is established by the color change from orange to green of a combined Eriochrome Blue Black R-methyl red indicator. The magnesium is converted to a non-interfering form by treating the serum with an alkaline borate solution in an amount sufficient to impart a pH from about 12 to 13 to the serum.

To the present time there is no reported method for directly titrating calcium in the presence of magnesium in a solution such as blood serum that provides sufficiently accurate results on a consistent basis, especially when working in micro quantities. The reason for this lack of a satisfactory method is due to the physiochemical obstacles presented in executing such a method. While other procedures for the quantitative direct titration of calcium in the presence of magnesium have been developed, the ones which might otherwise be suitable require costly apparatus and skilled personnel. Thus, the need and desirability of a direct titration method involving the consistently accurate visual determination of the end point is clear.

Some of the obstacles encountered in directly titrating calcium in the presence of magnesium using chelometric techniques include the inherent interferences which arise when dealing with mixed ion solutions. The closeness of the chelation constants of calcium and magnesium with the heretofore commonly used chelating agent ethylene diaminetetraacetic acid and its sodium salt (10.70 and 8.69 being the log $K$ values of the respective chelates) makes a quantitatively selective titration for calcium difficult and introduces inaccuracies in the result.

In addition, the solution frequently under analysis is blood serum. Blood serum contains other ions such as phosphates which further complicate the selection of a suitable chelating agent as well as a metal indicator which functions properly in the presence of the various ions in solution. The metal indicator must indicate the presence or absence of calcium without interference from magnesium or other metals found in the serum and must be stable at room temperature in the working solution. It has been extremely difficult to find the right combination of chelating agent and indicator suitable for use under the complex conditions existing in solution.

Heretofore, direct titration methods have sought to avoid the interference of the magnesium in the calcium solution by conducting the titration in strongly alkaline solution. This was done in order to precipitate magnesium as the hydroxide so that it was no longer in a form capable of interferring with the chelation of the calcium and the operation of the calcium indicator. However, under the conditions employed, calcium coprecipitated and with the metal indicator was absorbed on the surface of the magnesium hydroxide to an extent that influenced the test results to an unsatisfactory degree. There have been attempts to overcome the source of error introduced by the absorption of calcium and the metal indicator on the surface of the magnesium hydroxide. Unfortunately, the attempts are not wholly satisfactory and usually require additional steps such as a back titration. In any case, none of the methods provide a satisfactory method for determining calcium in a simple direct titration with its obvious advantages.

Recently some of the many problems have been solved by the use of ethylene glycol bis ($\beta$-aminoethyl ether)-N,N'-tetraacetic acid as the complexing agent for calcium. For ease of discussion, the compound ethylene glycol bis ($\beta$-aminoethyl ether)-N,N'-tetraacetic acid will hereinafter in the specification and claims be referred to as EGTA, an abbreviation that has found acceptance in the art. The use of EGTA as a chelating agent permits a more nearly selective titration of calcium in the presence of magnesium owing to the relatively large difference of the chelation constants. A difference of 5.8 in the log $K$ of calcium and magnesium with EGTA has been found (log $K_{Ca}=11.0$, log $K_{Mg}=5.2$). While the use of EGTA in a direct titration of calcium greatly improves the accuracy of the result, it still is not sufficiently accurate for calcium determinations, particularly when working with a visual end point.

The present method improves upon the prior art use of EGTA for determining calcium and provides a method that yields consistently accurate results even when titrating to a visual end point. The present improvement comprises, broadly, selectively removing magnesium from the sample under analysis by treating the sample with an alkaline borate solution in an amount required to adjust the pH to between about 11 and 14. Preferably, the alkaline borate solution is added to adjust the pH to about 12 to 13.

The addition of the borate in strongly alkaline solution causes the magnesium to form a non-interfering product therewith. The non-interfering magnesium and borate product binds the magnesium and prevents it from complexing with the EGTA to thereby cause an erroneously high value for calcium.

Without intending to limit the present invention by theory herein advanced, it is believed that the magnesium forms an insoluble glass with the alkaline borate while the calcium remains capable of being complexed at the indicated pH. It is believed that under the conditions created there is less tendency for the calcium to form the hydroxide and there is negligible absorption of the calcium hydroxide onto the surface of the precipitated magnesium glass. It is likely that the calcium undergoes the same reactions as the magnesium, forming a hydroxide and perhaps reacting with the borate, but in the case of calcium the product is sufficiently soluble so that the calcium is still available for reaction with the complexing or sequestering agent EGTA. On the other hand, it is believed that the magnesium in the strongly alkaline solution forms the hydroxide which in turn fuses with the borate to form a product that is sufficiently insoluble under the process conditions to prevent any magnesium from "rebounding" into solution and complexing with the EGTA as the calcium end point is reached.

Under the circumstances, it is essential to the proper execution of the present improved method that the operating solution be strongly alkaline, i.e. between a pH of about 11 and 14 so that magnesium will form a hydroxide which will then be available for fusion with the borate. In this regard, the present method should not be confused with prior art methods which employed buffer solutions such as ammonia buffers and borate buffers to maintain a pH of 10 and below throughout the course of the titration. The conditions existing in these prior art solutions were not suitable for achieving the present substantially complete deactivation and elimination of the magnesium as an interfering entity in the analysis for calcium.

As noted above, the present improvement enables the calcium determination to be carried out as a direct titration in which the end point may be visually determined. In such a determination, the EGTA is added to the sample to complex with the calcium in solution. When all of the calcium has been complexed, an indicator previously added to the sample that is sensitive to the presence or absence of complexed calcium changes color to establish the end point.

The indicator itself is a complexing or sequestering agent much the same as the EGTA. Suitable indicators include "chrome" type dyes that form one color when complexed with a metal and another color when devoid of a metal. In addition, a suitable indicator must also have a dissociation constant between the metal-indicator less than that of the metal-EGTA constant. This is necessary so that when the EGTA is added as a titrant, it is able to sequester the metal (calcium) in the solution in competition with the indicator. If the indicator formed a stronger bond with the calcium than the calcium with the EGTA, the method would be wholly unsuitable.

Numerous metal indicators have been suggested for titration of calcium with ethylenediaminetetraacetic acid in alkaline solution. Generally, most of these indicators may be used in the present method and include the following indicators as typical examples: Acid Chrome Blue K, Acid Chrome Dark Blue, Calcein, Chrome Azurol S, Chromogen Blue K, Chromogen Dark Blue, Eriochrome Black T, Eriochrome Blue Black B, Eriochrome Blue SE, 2-Hydroxy-1-(2-hydroxy-4-sulfo-1-naphthylazo)-3-naphtholic, Murexide, Phthaleincomplexone, Pyrogallolcarboxylic acid, Zincon.

It has been found that Eriochrome Blue Black R is most satisfactory for present purposes. This dye is the sodium salt of 1-(2-hydroxy-1-naphthylazo)-2-naphthol-4-sulfonic acid. At a pH between 11 and 14 this indicator has a red shade in the presence of calcium and is blue when the calcium is completely complexed with the EGTA. The performance of this indicator in mixed ion solutions in the presence of strong alkali improves with an increasing magnesium/calcium ratio. The pK values of the stability constants of the 1:1 calcium and magnesium complexes are 5.25 and 7.56 respectively. Because of these properties, it has been found to give superior results in the present method using EGTA.

Although the color change of the Eriochrome Blue Black R at the end point is reasonably distinct, the change from pink or red to blue presents a violet transitional zone. With small quantities of samples such as serum being analyzed, this zone partly obscures the sharp end point required. The requisite sharpness of change may be obtained by adding a dye to the Eriochrome Blue Black R indicator that is yellow at the pH present in the solution during the entire course of the titration. When such a dye is added, there is a marked increase in the clarity of the end point which is then evidenced by a color change from a brilliant orange to brown at the transition zone to a clear green at the end point. The somewhat muddy brown color of the transitional zone is easily distinguished from the sharp green of the final end point.

Any number of yellow dyes may be used for this purpose such as Propyl Red, p-Nitrophenol, Chrysoidin R, Chrysoidin Y, Benzene-azo-alpha-naphthylamine, Ethyl Orange, alpha Naphthyl-amineazobenzene-p-sodium sulphonate, Maritus Yellow, Cresol Red, Orange IV, and the like.

It has been found that methyl red is a most satisfactory dye to be used for this purpose. The relative concentration of the Eriochrome Blue Black indicator and the yellow dye may be blended to create a final color of a green-blue to a light yellow-green depending upon the taste or the visual acuity of the investigator.

As taught by the prior art, the calcium determination is not only influenced by magnesium but by other ions such as phosphate as well. The present method is not influenced by concentration of other ions such as phosphate in the sample except when present in unusually large concentrations. For example, the presence or absence of phosphate in the usual concentrations found in serum have been demonstrated not to influence the value of calcium obtained by the present method. However, substantially higher concentrations of phosphate may require consideration. When working with such a concentrated solution, the phosphate ion should preferably be removed by slurrying a small amount of an anion exchange resin in the chloride form with the sample prior to the calcium determination to prevent any possible source of error. The phosphate will be absorbed onto the exchange resin and therefore not be actively present during the calcium determination.

The indicator selected for use in the present method is used in the same manner as indicators are normally used. Thus, a few drops of the indicator is added to the solution sufficient to impart enough color in solution for easy detection of any change. The preferred indicator Eriochrome Blue Black R with methyl red is suitably combined in about equal weight ratios in a suitable diluent such as methyl alcohol. An anti-oxidant such as hydroxylamine hydrochloride may be added to the indicator solution to enhance its stability.

The alkaline borate solution is preferably made from an alkali metal hydroxide and an alkali metal borate. The hydroxide is added to the sample in an amount sufficient to obtain the previously noted pH range. The alkali metal borate is added on a mole basis in an amount preferably at least equal to the moles of magnesium hydroxide that is formed upon addition of the alkali. An excess of the borate will not adversely affect the determination and since the precise quantity of magnesium present is generally not known, a substantial excess of the borate is generally added.

The calcium is determined by using a standard solution of EGTA and by observing the volume of EGTA necessary to reach the end point. The amount of calcium in the sample is readily calculated by the usual formula.

The present method is well suited for use in connection with the micro-titrator disclosed and claimed in copending patent application Serial No. 42,106, filed July 11, 1960, entitled Metering Device. The following experiments were conducted with said micro-titrator. It should be understood that these examples are offered for illustrative purposes only.

The examples which follow all made use of the following reagents:

*Indicator Solution*

| | Mg. |
|---|---|
| Eriochrome Blue Black R | 50 |
| Methyl Red | 50 |
| Hydroxylamine HCl | 400 |
| Methyl alcohol, q.s. 100 ml. | |

(Stable at room temperature)

*Alkaline Borate Solution*

To 200 ml. of water add 240 mg. of sodium borate. Boil for ten minutes. Cool to 60° C. Add 36 grams of KOH. Agitate to dissolve. Add pinch of KCN to complex iron and other metals in solution to avoid interference therefrom.

*Stock EGTA Solution (0.01 M)*

Place 1.9 grams of EGTA in water containing 10.1 ml. of 1 M NaOH. Dilute to 500 ml. with double distilled deionized water and store at room temperature in a polyethylene bottle.

*Working EGTA Solution (0.00025 M)*

Dilute 5.0 ml. of stock EGTA solution to 200 ml. with double distilled deionized water. Store in polyethylene bottle.

The results given in tabular form below were obtained as follows:

(1) 3 drops of water were placed in a titration cup.
(2) 50 lambda of a sample containing calcium was placed in the cup.
(3) 1 drop of the alkaline borate solution was added.
(4) The cup was agitated to assure interaction of all constituents in the cup. 2 drops of indicator solution was added.
(5) The constituents in the cup were titrated with EGTA to a green end point.

|   | Sample | Number of trials | Calculated Mean Value of Calcium, mg. percent | Mean Value of Calcium in Titrator Dial Units |
|---|---|---|---|---|
| I | Versatol (Standard simulated blood serum containing 10 mg percent Calcium). | 6 | 10.17 | ---------- |
| II | Water Standard containing 10 mg. percent Calcium | 10 | ---------- | 23.1 |
| III | Same as II with 50 lambda aliquot containing 2 meq. of magnesium added. | 5 | ---------- | 23.3 |
| IV | Same as II with 50 lambda aliquot containing 6 meq. of magnesium added. | 5 | ---------- | 23.3 |
| V | 50 lambda of pooled serum | 5 | 10.3 | ---------- |
| VI | Same as V but serum passed through a chloride ion exchange column and rinsed 3X. | 5 | 10.3 | ---------- |

Line I illustrates absolute accuracy of present method using a known serum which contains magnesium and other ions.

Lines II, III and IV illustrate relatively insignificant effect of varying concentration of magnesium with present method.

Lines V and VI illustrate that phosphate and other ions in concentrations routinely found in blood serum do not affect the result of calcium determination by present method.

Reliability of the method is demonstrated by calculated standard deviation using the results from the foregoing tests as well as the results obtained on a large number of 50 lambda samples of randomly obtained blood serum. The overall average standard deviation was 0.15 mg. percent.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the method for the quantitative analysis of a sample containing calcium in the presence of magnesium by directly titrating the calcium with EGTA in the presence of an indicator that changes color at the end point, the improvement which comprises treating the sample with an alkaline borate solution in an amount sufficient to adjust the pH of the treated sample to between about 11 and 14, whereby the magnesium forms a non-interfering product which does not complex with the EGTA to cause an erroneously high apparent value for calcium.

2. In the direct volumetric analysis method to determine calcium in the presence of magnesium by titrating a solution containing said elements with EGTA to an end point fixed by the substantially total removal of calcium from solution through complex formation with the EGTA titrant, said solution containing an indicator that produces a color change at said end point for establishing the same, the improvement which comprises converting the magnesium in the solution to a non-reactive form by adding an alkaline borate solution thereto to bring the pH to between about 11 and 14, whereby the magnesium forms a glass-like fusion product with the borate and does not interfere with the titration of the calcium.

3. A method for the direct volumetric determination of calcium in a liquid sample containing magnesium which comprises adjusting the pH of said sample to about 12 to 13 with an alkaline borate solution to form a non-interfering fusion product with the magnesium, and titrating said adjusted sample to an end point with EGTA in the presence of a calcium indicator that changes color at said end point.

4. The method in accordance with claim 3 wherein the calcium indicator is Eriochrome Blue Black R.

5. A method for the direct volumetric determination of calcium in a liquid sample containing magnesium which comprises adjusting the pH of said sample to about 12 to 13 with an alkaline borate solution containing an alkali metal borate and an alkali metal hydroxide to form a non-interfering fusion product with the magnesium, and titrating said adjusted sample to the end point with EGTA in the presence of Eriochrome Blue Black R indicator.

6. A method for the direct volumetric determination of calcium in blood serum containing magnesium which comprises adjusting the pH of said serum to about 12 to 13 with an alkaline borate solution containing an alkali metal borate and an alkali metal hydroxide to form a non-interfering fusion product with the magnesium, and titrating said adjusted serum to an end point with EGTA in the presence of an indicator that changes to green at the end point resulting from the chelation of substantially all of the calcium in the sample with EGTA, said indicator comprising Eriochrome Blue Black R and a dye that is yellow at the pH during the entire course of the titration.

7. A method in accordance with claim 6 wherein said yellow dye is methyl red.

References Cited in the file of this patent

UNITED STATES PATENTS

| 2,910,349 | Reeder et al. | Oct. 27, 1959 |
| 2,912,309 | Free | Nov. 10, 1959 |
| 2,980,696 | Korble | Apr. 18, 1961 |
| 2,910,349 | Wendell | Oct. 27, 1961 |

OTHER REFERENCES

Clinica Chemica Acta, vol. 2, 1957, pages 327–331.
Baron et al.: Jour. Clinical Pathology, vol. 12, 1959, pages 143 to 148. (Copy in Library.)